United States Patent [19]
Nasiri

[11] Patent Number: 5,880,372
[45] Date of Patent: Mar. 9, 1999

[54] MEDIA COMPATIBLE PRESSURE SENSOR DEVICE UTILIZING SELF-ALIGNED COMPONENTS WHICH FIT TOGETHER WITHOUT THE NEED FOR ADHESIVES

[75] Inventor: Steven Saeed Nasiri, Saratoga, Calif.

[73] Assignee: Integrated Sensor Solutions, San Jose, Calif.

[21] Appl. No.: 781,418

[22] Filed: Jan. 10, 1997

[51] Int. Cl.[6] .................................................. G01L 9/04
[52] U.S. Cl. ............................................. 73/726; 73/723
[58] Field of Search ........................ 361/283.4; 73/724, 73/718, 726, 727, 720, 721, 723, 717; 338/42

[56] References Cited

U.S. PATENT DOCUMENTS 4,875,135  10/1989  Bishop et al. ........................ 73/718 X
5,343,757   9/1994  Tate ...................................... 73/718 X Primary Examiner—Joseph L. Felber
Attorney, Agent, or Firm—Sawyer & Associates

[57] ABSTRACT

The present invention provides a pressure sensor device which is media compatible and very inexpensive.

A medium compatible device according to the present invention for sensing pressure comprising means for sensing pressure; means for providing an output in response to the pressure sensing means; and means for packaging the pressure sensing means and the output means, the packaging means including a non-adhesive means for combining the pressure sensing means and the output means.

3 Claims, 7 Drawing Sheets

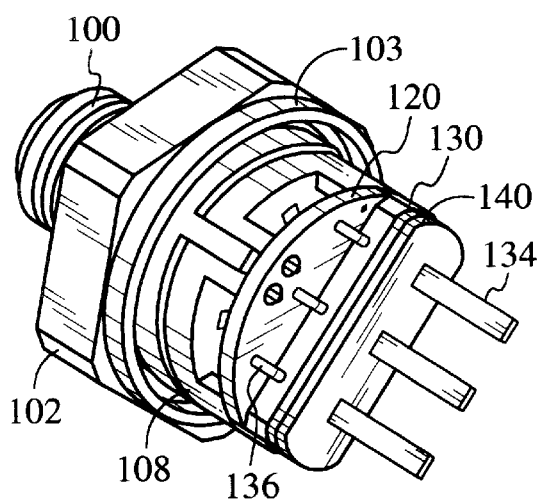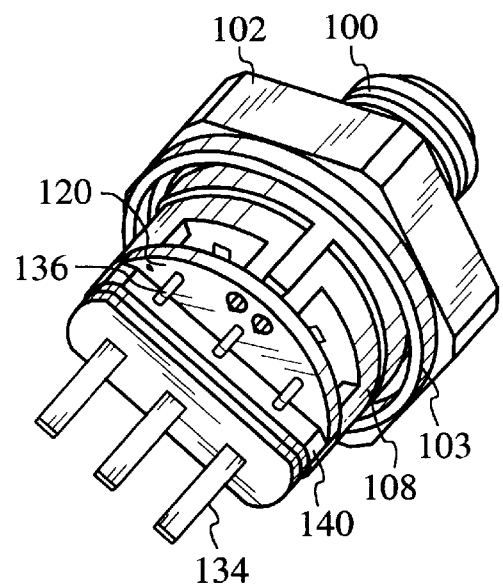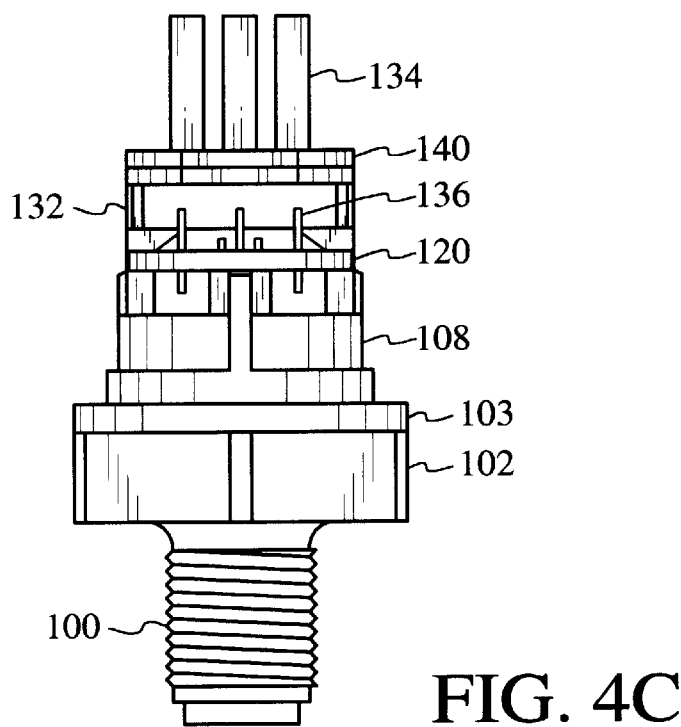
FIG. 4A
FIG. 4B
FIG. 4C

MEDIA COMPATIBLE PRESSURE SENSOR DEVICE UTILIZING SELF-ALIGNED COMPONENTS WHICH FIT TOGETHER WITHOUT THE NEED FOR ADHESIVES

FIELD OF THE INVENTION

The present invention relates to a media compatible device for sensing pressure, and more particularly, to a media compatible pressure sensor utilizing self-aligned components which fit together without the need for adhesives.

BACKGROUND OF THE INVENTION

Pressure sensors are currently used in various industries such as automotive, refrigeration, industrial, and agriculture. The main purpose of a pressure sensor is to measure pressure and to provide an electrical output. However, for many uses, it is important that the pressure sensor is compatible with the media in which it is used. A media compatible pressure sensor, sometimes referred to as a media isolated pressure sensor, may be required to work in harsh environments. For example, a media compatible pressure sensor may be used to measure brake fluid in a car. The area which touches the media needs to be inert to the media such as brake fluid, otherwise, the brake fluid may eat away at the material.

At times, the environment can be worse than the media in which the pressure sensor operates. For instance, a pressure sensor device may be located underneath a car which is continually exposed to salt and road dirt. Thus, it is critical to have the packaging for the pressure sensor to be able to withstand both the harsh environment and the media. Typically, many packages for pressure sensors include steel bodies which have laser welding and various other operations performed upon it to achieve the necessary durability. Because of the packaging costs, the conventional pressure sensor device is typically very expensive, ranging from $50–$500.

Another factor which adds to the cost of the conventional pressure sensor device is the inability to automatize the manufacture and testing of these devices due to conventional uses of batch mode processing.

The conventional pressure sensor device also utilizes various flex circuits to provide the necessary interconnects, sending of the output, and signal positioning. The use of flex circuits is typically very expensive and will also add additional interconnects which can perpetuate reliability problems.

Other factors which can create reliability problems include the use of epoxies to glue various components together. Additionally, various portions of the conventional pressure sensor device are typically soldered together which can also create reliability problems.

What is needed is a reliable, inexpensive pressure sensor device which avoids these problems. The present invention addresses such a need.

SUMMARY OF THE INVENTION

The present invention provides a pressure sensor device which is media compatible and very inexpensive.

A medium compatible device according to the present invention for sensing pressure comprises means for sensing pressure, means for providing an output in response to the pressure sensing means; and means for packaging the pressure sensing means and the output means, the packaging means including a non-adhesive means for coupling the pressure sensing means and the output means.

BRIEF DESCRIPTION OF THE DRAWINGS

FIG. 2A shows the top view while FIG. 2B shows the underside of the pressure sensor device.

FIGS. 4A–4F show various angles of a partially assembled pressure sensor device according to the present invention.

DESCRIPTION OF THE INVENTION

The present invention relates to a media compatible pressure sensor device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
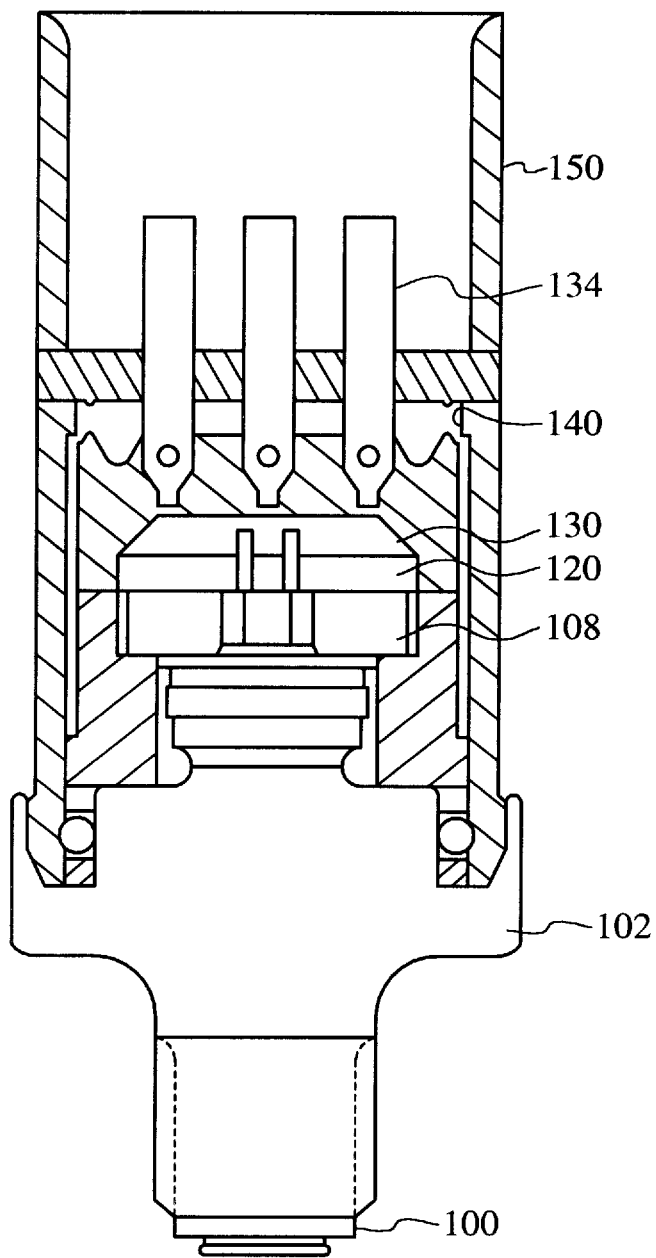
FIG. 1 shows a cut-away perspective view of the pressure sensor device according to the present invention.

FIG. 1 is a cut-away perspective view of a pressure sensor device 10 in accordance with the present invention. FIG. 1 includes a pressure port 100, a pressure sensor base assembly 102, a spacer 108, a printed circuit board 120, a contact assembly 130, a gasket 140, and a connector housing 150.

A pressure sensor device in accordance with the present invention is a device which is compatible with the media and very inexpensive. The pressure sensor device 10 in accordance with the present invention uses a package assembly which is flexible enough to self-align the components when the components are combined. It also utilizes a press-fit system to provide a temporary lock of the various components to allow for performance of wire bonding and assembly test and calibration. The pressure sensor device is then coupled together by pressing the pressure sensor housing 150 over the remaining components and crimping one end of the housing 150 together with the base assembly 102 of the pressure sensor device 10 to allow the housing 150 to be interlocked with the base assembly 102.

The use of the interlocking techniques facilitate a combination of the components without the use of epoxies. This pressure sensor device is very user friendly and allows for a high level of automation. The pressure sensor device in accordance with the present invention allows for automated in-line continuous test and calibration both at room temperature and at high temperature.

To more clearly describe the features of the pressure sensor device in accordance with the present inventions, refer now to the following text in conjunction with the accompanying figures.

Figure 2A:
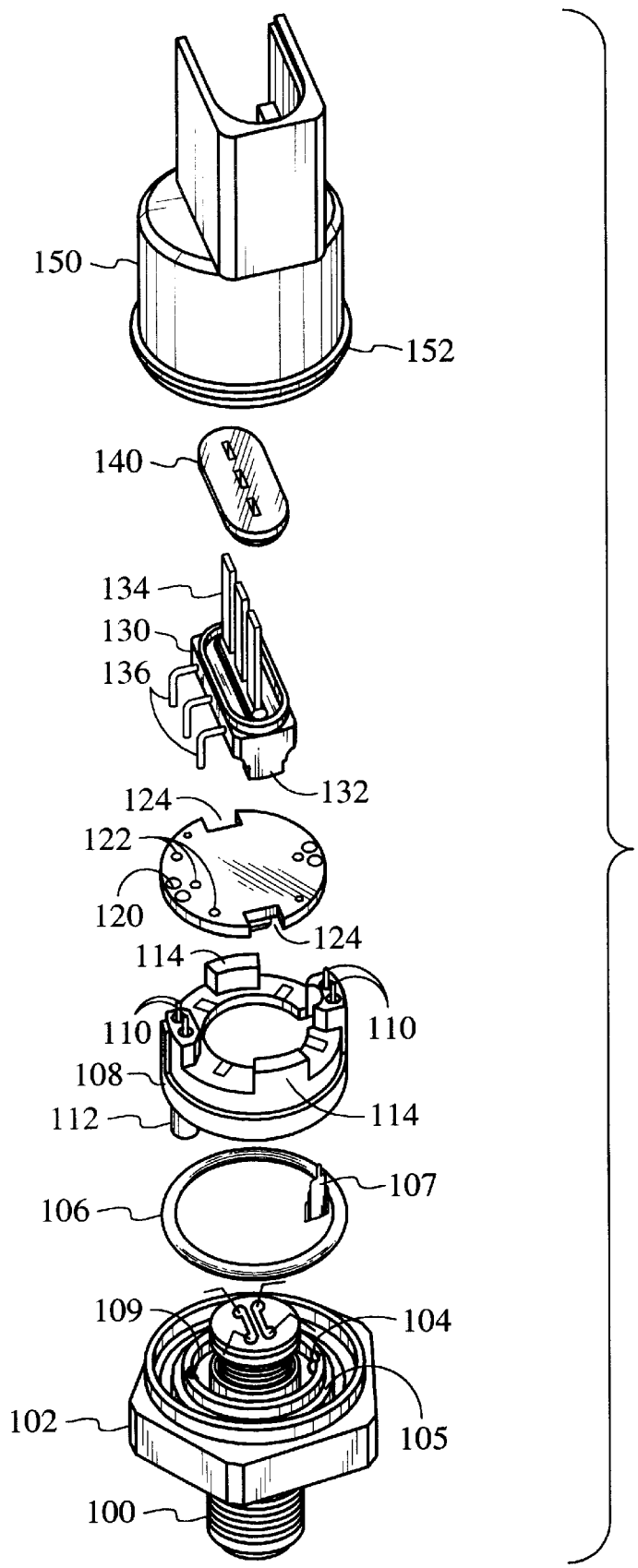
FIGS. 2A and 2B show a first and second exploded view of the pressure sensor device 10 according to the present invention.
Figure 2B:
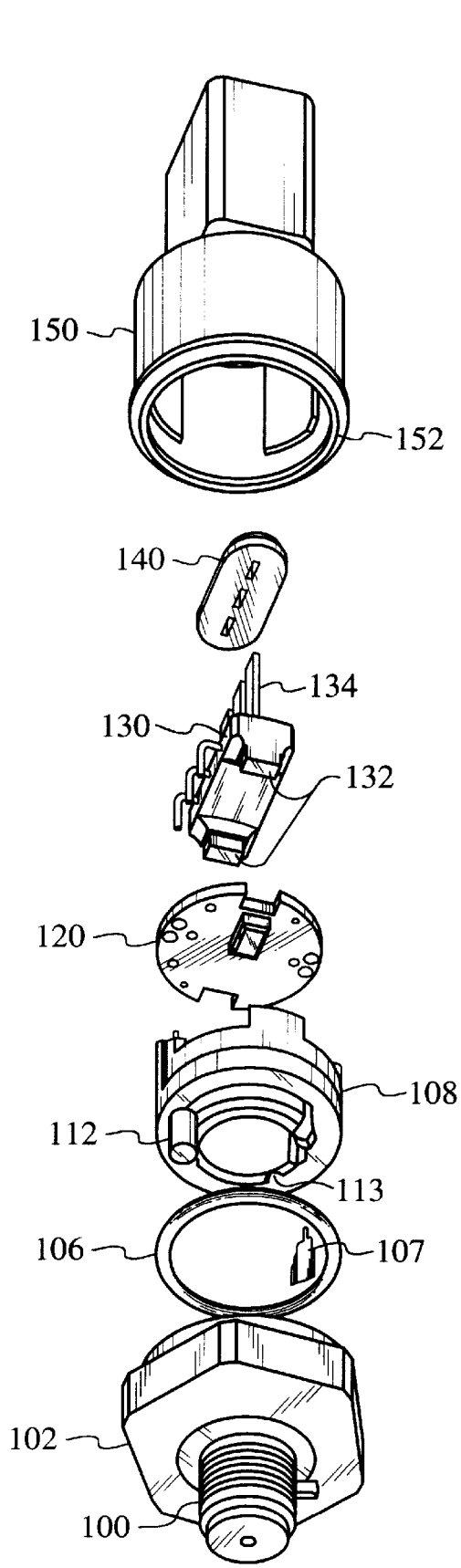
Figure 3A:
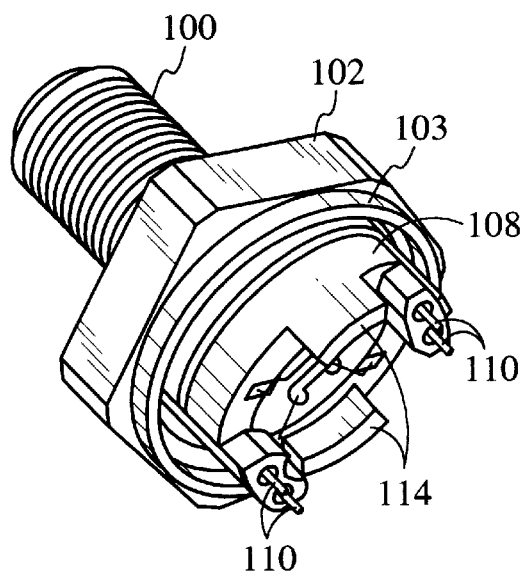
FIGS. 3A–3D show various angles of a partially assembled pressure sensor device according to the present invention.
Figure 3B:
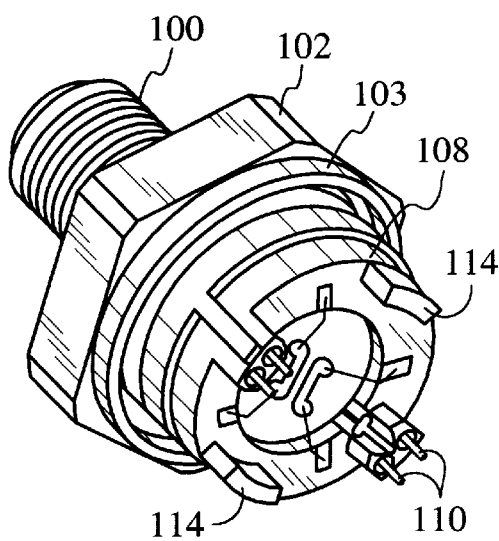
Figure 3C:
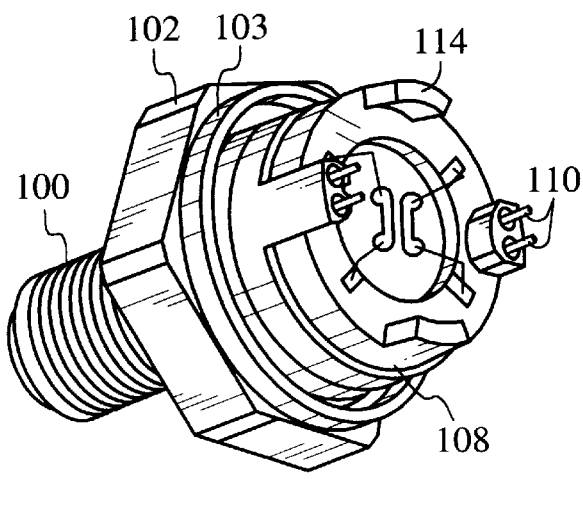
Figure 3D:
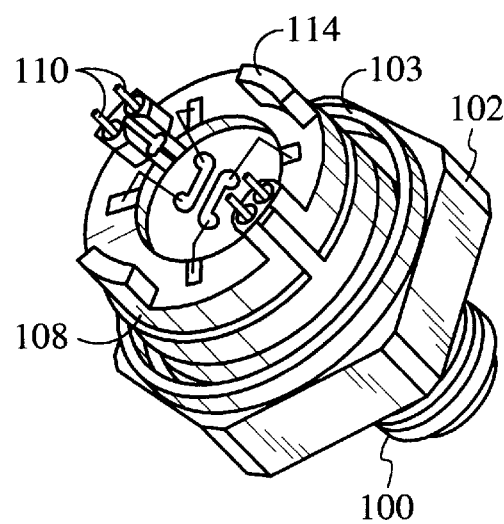

FIGS. 2A and 2B show a first and second exploded view of the pressure sensor device 10 according to the present invention. FIG. 2A shows the top view while FIG. 2B shows the underside of the pressure sensor device. FIGS. 2A and 2B show a pressure port 100, a pressure sensor base assembly 102, including a pressure sensor module 105, an O ring 106, a ground log 107, a spacer 108, a printed circuit board 120, a contact assembly 130, a gasket 140, and a connector housing 150.

The pressure port 100 provides protection against the media outside the pressure sensor device. It also seals against the environment and defines the orientation regarding the pressure sensor module (PSM) 105 and spacer 108. The pressure port 100 further functions to fix the spacer 108 during transportation and mounting. The pressure port 100 is connected to the pressure sensor base assembly 102.

The pressure sensor base assembly 102 includes the PSM 105, a case ground contact 104, an interlock receiver 109, and crimping lip 103. The PSM 105 senses pressure and provides electrical interconnections. The case ground contact 104 receives the ground log 107. Additionally, the interlock receiver 109 receives the interlock 112 located on the spacer 108. The purpose of the crimping lip 103 is to combine with a crimping mechanism 152 located on the connector housing 150 to finally assemble all the components of the pressure sensor device 10.

The O-ring seal 106 seals the space between the spacer 108 and the pressure sensor base assembly 102 to provide moisture seal and friction against rotation.

The spacer 108 functions to provide an interconnect to the PSM 105. It also supports and provides orientation for the PC Board 120. The spacer 108 further provides support against torque and provides orientation for the connector housing 150. The spacer 108 press-fits onto the O ring 106 and the pressure sensor base assembly 102 by inserting the locator 112 into the mating hole receiver 109 and receiving the ground log 107, which is situated in the case ground contact 104, into the ground log receiver 113, as shown in FIG. 2B. The interlocking press-fit design allows the pressure sensor device to be assembled into proper place without the use of epoxies.

FIGS. 3A–3D show various angles of a partially assembled pressure sensor device according to the present invention. The illustrated partial assembly shows the pressure port 100, the pressure sensor base assembly 102, the crimping lip 103, the spacer 108, the metal inserts 110, and the raised surface 114.

Referring back to FIGS. 2A and 2B, the ground log 107 is a contact which acts as a connector and fits into the case ground contact 104 in the pressure sensor base assembly 102 to provide a case ground. Another portion of the ground log 107 fits into the ground log receiver 113 of the spacer 108. The present invention utilizes a case ground for electromagnetic interference (EMI) protection. A strong case ground is required to achieve appropriate EMI protection. Typically, to provide a strong case ground a metal connection to the case is made through soldering or welding a connector thereto. One of ordinary skill in the art would understand the details of the achieving this EMI protection and thus, for simplicity, will not be discussed in more detail. The fit and lock system provided by the ground log receiver 113, the ground log 107, and the case ground contact 104 provides case ground without the welding or soldering required by prior art design. Thus, it is very reliable because of the c-clamp design of the connector allows for a reliable press fit. The c-clamp design also allows for a constant spring force and provides a continuous contact to the pressure sensor base assembly. In a preferred embodiment, the ground log 107 can be soldered to the PC board 120 directly.

The spacer 108 includes two raised surfaces 114, preferably 90 degrees in orientation from the plane of the spacer 108. The interlock 112 provides polarity protection in the assembly of the spacer 108 into the pressure sensor base assembly 102. The metal inserts 110, preferably nickel plate with gold plating, provide a means of interconnects between the spacer 108 and the pressure sensor base assembly 102 by using ultrasonic aluminum wire bonding or gold wire techniques. The metal inserts 110 also provide interconnects between the spacer 108 and the PC board 120. The spacer 108 also provides the required height clearance for components on the PC board 120 to stay clear from the wires interconnects of the pressure sensor base assembly 102.

The spacer 108 is designed to provide electrical connection to the PC board 120 via metal inserts 110. The PC board 120 fits on the spacer 108 and the two components can be soldered together. The spacer 108 is preferably soldered in numerous locations. Examples of possible soldering locations can include the four metal inserts 110.

The PC board 120 supports electrical circuitry for the sensors. It also provides locations to perform tests and calibrations. For example, the PC board can support numerous contacts, for example, in a preferred embodiment, 11 contacts, which can make electrical contact for continuous test and assembly. The PC board 120 can also in a preferred embodiment, provide a contact for sensor compensation.

The PC board 120 provides clearance for the contact assembly 130 to rest on the spacer 108. The PC board 120 also provides three solder connections 122 for the contact assembly 130 to provide electrical interconnect to the outside world.

The main function of the contact assembly 130 is to provide electrical interconnects between the outside world and the PC board 120 via the contact pins 134. The contact pins 134 are preferably designed to flex in any direction to facilitate stress release. The contact assembly 130 also includes plastic interconnects 132 which fit into the interconnect slots 124. Angled pins 136 provide stress relief on solder joints by acting as a spring to flexing the contact assembly 130 to alleviate pressure on the solder joints.

The gasket 140 seals the space between the housing 150 and the contact assembly 130. The gasket 140 provides the force required to fix the contact assembly 130 to the connector housing 150, against any vibration and/or thermal stresses.

FIGS. 4A–4E show various angles of a partially assembled pressure sensor device according to the present invention. Each of the FIGS. 4A–4E show the pressure port 100, the pressure sensor base assembly 102, the spacer 108, the printed circuit board 120, the contact assembly 130, and the gasket 140.

Figure 4D:
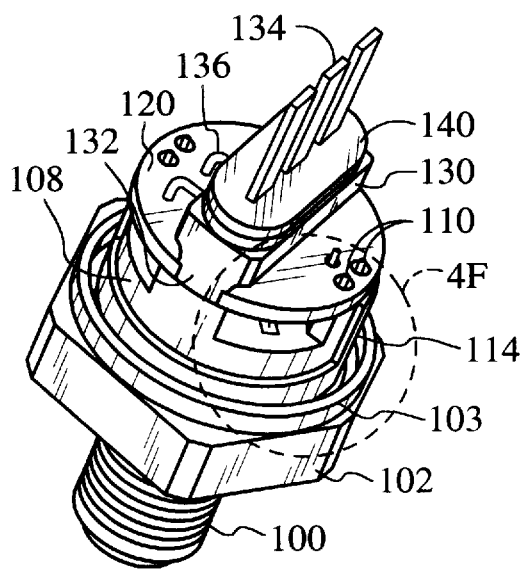
Figure 4E:
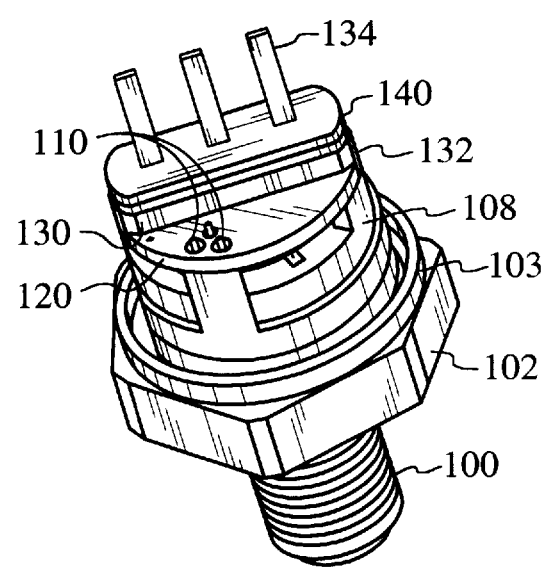
Figure 4F:
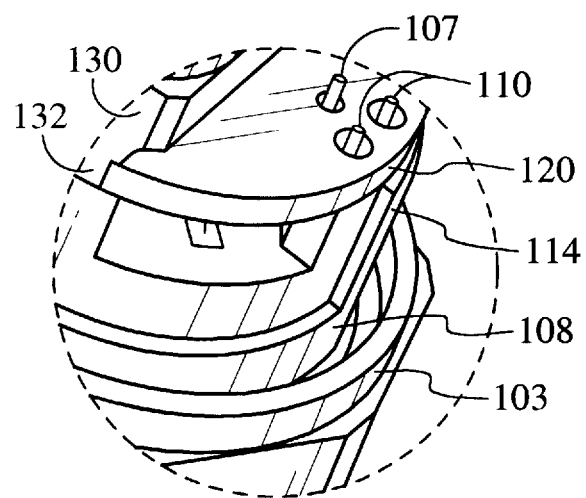

FIG. 4D further shows the crimping lip 103 of the pressure sensor base assembly 102, the raised surface 114 of the spacer 108, the metal inserts 110 of the spacer 108, the interconnect 132 of the contact assembly 130, the angled pins 136 of the contact assembly 130, and the contact pins 134 of the contact assembly 130. Additionally, FIG. 4F is a close-up view of the encircled portion of FIG. 4D which shows how the spacer 108, the printed circuit board 120, and the contact assembly 130 press-fit together. The interconnect 132 of the contact assembly 130 fits together with the printed circuit board 120. The contact assembly 130 is aligned by the orientation of the printed circuit board 120 which is determined by the location of the metal inserts 110 of the spacer 108. The orientation of the printed circuit board 120 is also determined by the position of the ground log 107 which in turn is fixed into position by the orientation of the case ground contact 104 of the base assembly 102 shown in FIG. 2A.

The connector housing 150 provides outside housing protection and seals against environmental factors. The connector housing 150 provides connection to a mating connector (not shown). Additionally, when the connector housing 150 is combined with the remaining components, it fixes the location of the other components such that a problem with loose components is eliminated. The housing 150 should have a tight enough dimensional tolerance so that when the housing is pushed over the other components, it can force the other components, including the PC board, to self-align. The other components are preferably flexible enough to self-align when the housing 150 is placed over the other components.

The connector housing 150 includes a crimping mechanism 152 which works in conjunction with the crimping lip 103 on the pressure sensor base 102 to crimp and lock the connector housing 150 onto the pressure sensor base assembly 102. The crimping mechanism 152 can be any mechanism which crimps and locks two components together.

Figure 5:
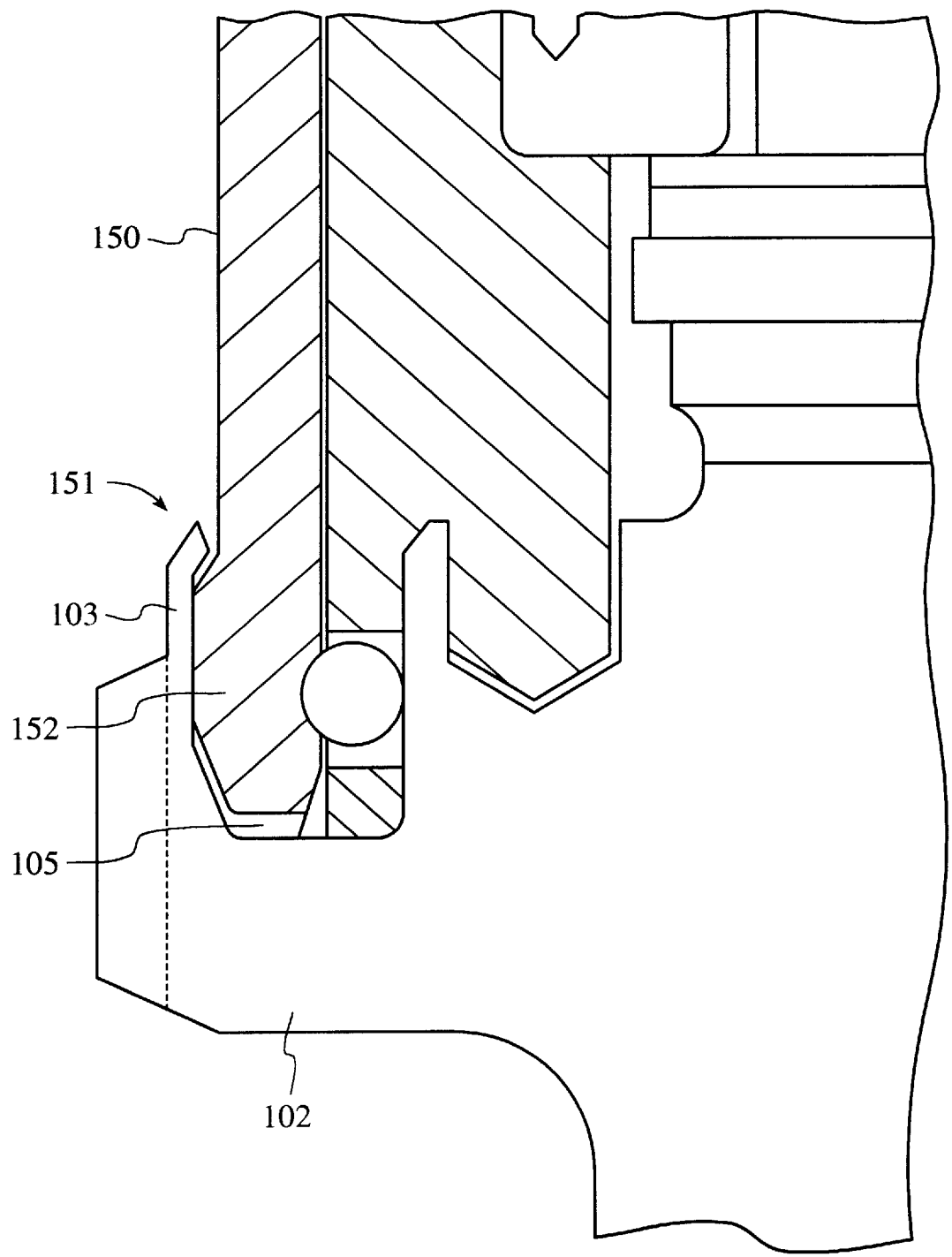
FIG. 5 shows a more detailed diagram of one example of the crimping mechanism.

FIG. 5 shows a more detailed diagram of one example of the crimping mechanism 152. In this embodiment, a crimp ring 151 is deformed over the housing 150. The crimp angle is designed for optimum interference fit. Gap 105 is designed based upon conventional Tolerance Stacking analysis to ensure complete press down of the housing and the complete subassembly prior to crimping.

Referring back to FIG. 4A–4F, when the spacer 108 is first positioned, a temporary fit from the press-fit of the various interconnecting components can be used to perform the wire bond and assembly test and calibration. The interconnecting components include the interlock 112, the interlock receiver 109, the ground log receiver 113, the ground log 107, and the case ground contact 104. When the entire pressure sensor device is packaged together, then the gasket 140 is pressed which causes the interconnect 132 of the contact assembly 130 to interlock with the spacer 108. When the same force is pressed upon the spacer 108, then the crimping mechanism 152 of the connector housing 150 is crimped via the crimping lip 105 of the pressure sensor base 109 which interlocks the various components together. Thus, when the components are finally combined, the press-fit is no longer needed.

The pressure sensor device according to the present invention allows automation of placing the board, wire bonding, soldering, testing calibration, pickup and placement of the housing over the remaining components, crimping, and laser marking on the surface of the connector housing. This automation allows a faster, less expensive, method for manufacturing a pressure sensor device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A medium compatible device for sensing pressure comprising:

a pressure sensor assembly including a pressure sensor; the pressure sensor assembly also including a first press-fit portion and a first case ground portion;

a spacer assembly including a second press-fit portion fitting with the first press-fit portion, a second case ground portion, and at least one metal insert;

a ground log for press-fitting into the first and second case ground portions;

a printed circuit board with at least one metal insert receiver for receiving the metal insert;

a contact assembly including at least one press-fit mechanism for fitting with the printed circuit board and the spacer assembly; and a housing including a crimping mechanism for fastening the housing into proper location, wherein the housing fixes the location of the pressure sensor assembly, the spacer assembly, the ground log, the printed circuit board, and the contact assembly when the crimping mechanism is applied.

2. A medium compatible device for sensing pressure comprising:

means for sensing pressure;

means for providing an output in response to the pressure sensing means; and means for packaging the pressure sensing means and the output means, the packaging means including means for non-adhesively coupling the pressure sensing means and the output means wherein the output means includes:

a printed circuit board coupled to the pressure sensing means;

a spacer means connected to the printed circuit board; and a contact means coupled to the printed circuit board for providing electrical contact for electrical output wherein the contact means includes an interconnect means for coupling the contact means to a portion of the packaging means, the contact means also includes a pressure relief means including at least one angled pin.

3. A medium compatible device for sensing pressure comprising:

a pressure sensor;

an output assembly for providing an output in response to the pressure sensor; and a package for coupling the pressure sensor to the output assembly, the package including a non-adhesive mechanism for coupling the pressure sensor and the output assembly wherein the output assembly includes:

a printed circuit board coupled to the pressure sensor;

a spacer connected to the printed circuit board; and a contact coupled to the printed circuit board for providing electrical contact for electrical output, wherein the contact includes an interconnect for connecting the contact to a portion of the package, the contact also including a pressure relief mechanism including at least one angled pin.

* * * * *